United States Patent [19]

Sibbel

[11] 4,347,687

[45] Sep. 7, 1982

[54] WATERING SYSTEM FOR FLOWER POTS AND PLANT BOXES

[76] Inventor: Uwe Sibbel, Emser Strasse 44, 1000 Berlin 44, Fed. Rep. of Germany

[21] Appl. No.: 224,250

[22] Filed: Jan. 12, 1981

Related U.S. Application Data

[63] Continuation of Ser. No. 40,883, May 21, 1979, abandoned.

[51] Int. Cl.³ .............................................. A01G 27/00
[52] U.S. Cl. ............................................ 47/79; 47/81; 119/77; 137/453
[58] Field of Search .............................. 47/79–81; 137/453, 454; 119/77

[56] References Cited

U.S. PATENT DOCUMENTS

| | | | |
|---|---|---|---|
| 80,705 | 8/1868 | Boucher | 119/77 X |
| 583,261 | 5/1897 | Kirkwood | 119/77 |
| 798,493 | 8/1905 | Brown | 119/77 |
| 1,157,671 | 10/1915 | Bradley | 137/453 |
| 2,072,185 | 3/1937 | Schein | 47/81 |
| 4,023,305 | 5/1977 | Harschel | 47/81 |

FOREIGN PATENT DOCUMENTS

| | | | |
|---|---|---|---|
| 837332 | 4/1952 | Fed. Rep. of Germany | 47/81 |
| 1901238 | 6/1964 | Fed. Rep. of Germany | |
| 1757347 | 6/1971 | Fed. Rep. of Germany | 47/79 |
| 2149072 | 4/1973 | Fed. Rep. of Germany | |
| 2416802 | 10/1975 | Fed. Rep. of Germany | 47/79 |
| 2509724 | 9/1976 | Fed. Rep. of Germany | 47/79 |
| 2609277 | 9/1977 | Fed. Rep. of Germany | 47/81 |
| 2610613 | 9/1977 | Fed. Rep. of Germany | 47/81 |
| 2645995 | 11/1977 | Fed. Rep. of Germany | |
| 2645994 | 2/1978 | Fed. Rep. of Germany | 47/79 |
| 2714115 | 10/1978 | Fed. Rep. of Germany | 47/79 |
| 2717527 | 11/1978 | Fed. Rep. of Germany | 47/81 |
| 780065 | 4/1935 | France | 119/77 |
| 1241895 | 8/1960 | France | |
| 2328394 | 5/1977 | France | 47/80 |
| 256298 | 3/1970 | U.S.S.R. | 137/453 |

Primary Examiner—Steven A. Bratlie
Attorney, Agent, or Firm—Jacobson and Johnson

[57] ABSTRACT

A watering system for flower pots and plant boxes which uses watering cylinders located adjacent to the plant roots with the watering cylinders connected to a water supply unit through a closed pipeline system with the water supply unit maintaining a constant supply of water to the watering cylinders. One can regulate or control the water level in the watering cylinders by vertically adjusting the ventilation tube located within a transparent water pipe in the water supply unit.

1 Claim, 8 Drawing Figures

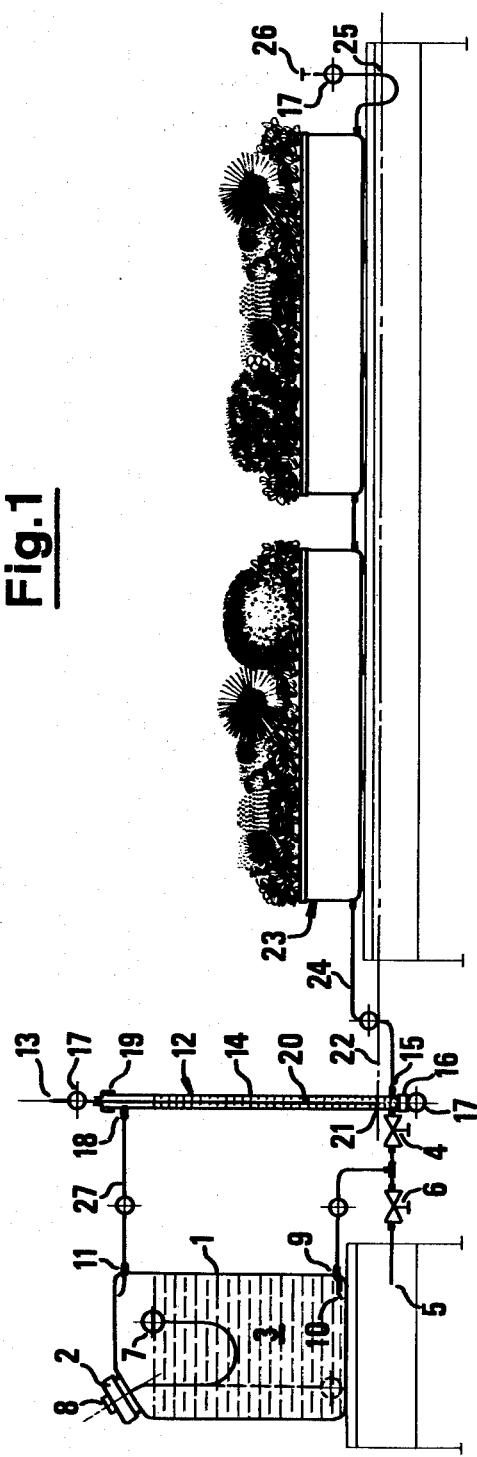

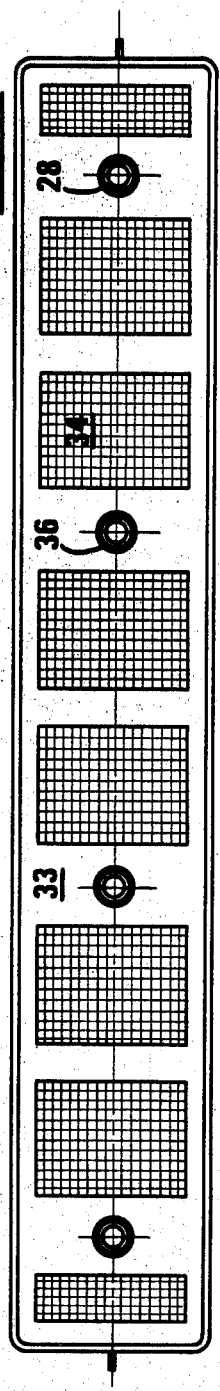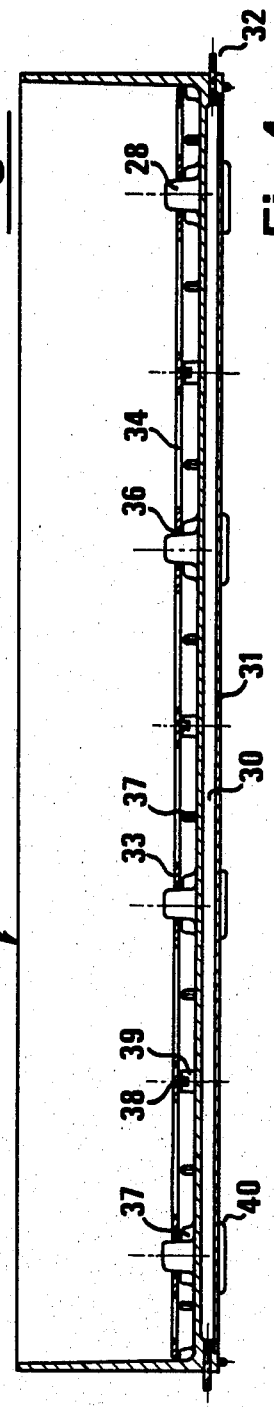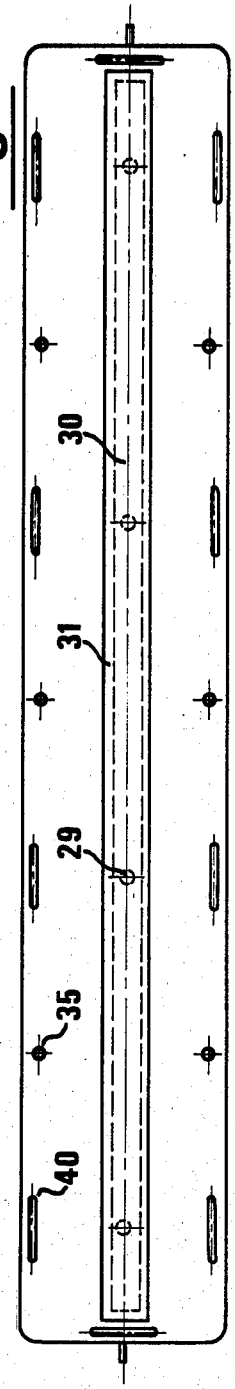

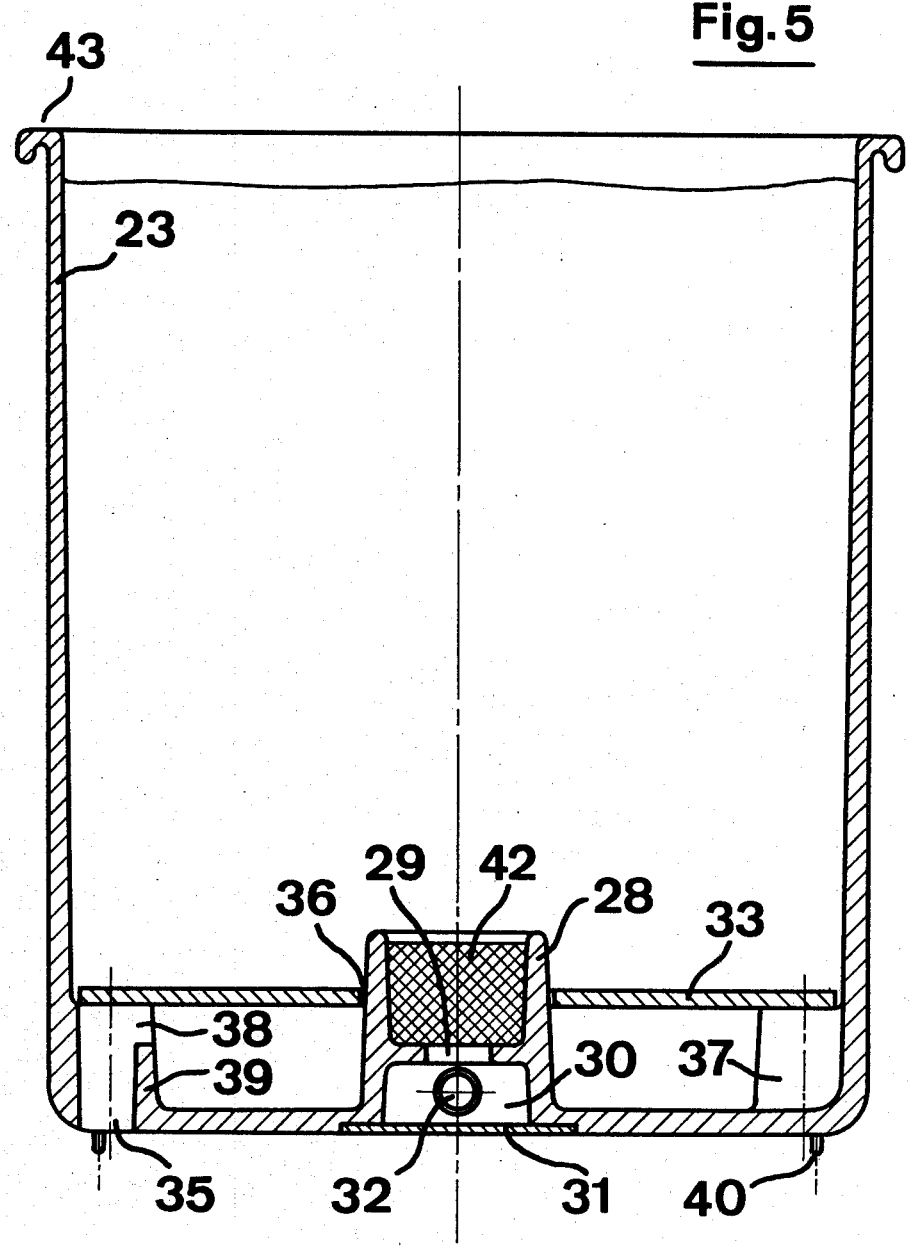

4,347,687

WATERING SYSTEM FOR FLOWER POTS AND PLANT BOXES

This is a continuation of application Ser. No. 040,883, filed May 21, 1979, now abandoned.

BACKGROUND OF THE INVENTION

1. Field of the Invention

This invention relates generally to watering systems and, more specifically, to automatic plant watering systems.

2. Description of the Prior Art

Watering systems for flower pots or plant boxes are normally used when watering plants cannot be performed daily or regularly or when the watering should be performed continuously rather than daily. Watering systems are especially useful in case of a long absence, for example, when nobody is present because of a business trip or holiday and no one is available to do the watering. In order to solve the problem of watering plants when no one is present, water containers within the flower pots or plant boxes have been proposed; however, their volume is limited by the size of the flower pot or plant box itself and, in most cases, the water supply is sufficient only for a limited period of time.

It is an object of the invention to keep the watering unit separate from the flower pot or plant box by providing a separate water supply which reduces the dependency of the water supply on the size of the flower pot or plant box.

SUMMARY OF THE INVENTION

The present invention includes watering cylinders which are connected to a water supply unit through a closed pipeline system. The water supply unit maintains the supply water at a constant level to permit continual watering of the plant roots in flower pots or plant boxes. The watering cylinders contain foam plugs which have cohering pores to prevent the penetration of soil from the roots into the watering channel and to also retard root growth into the watering channel. The quantity of the water supplied to the plant roots is controlled by the pressure of the water in the pore space around the roots and by adjusting the reference level of water in the pipeline system connecting to the water supply unit.

Typically, the watering cylinders are molded into the flower pots or plant boxes; however, they may be made separately and inserted into the plant box. The water supply unit attaches to a water container and comprises a tube made of transparent material which also functions as a visual water level indicator. A ventilation pipe fits into the transparent tube and is hermetically sealed to the top of the tube by a rubber or elastic collar seal that permits vertical displacement of the ventilation pipe within the transparent tube. The lower end of the ventilation pipe controls the level of water supplied to the flower pots.

BRIEF DESCRIPTION OF THE DRAWINGS

FIG. 1 shows the watering system of the present invention;
FIG. 2 shows the side sectional view of a plant box;
FIG. 3 shows a top view of a plant box;
FIG. 4 shows a bottom view of a plant box;
FIG. 5 shows a cross sectional view of a plant box.

DETAILED DESCRIPTION OF A PREFERRED EMBODIMENT

Figure 7:
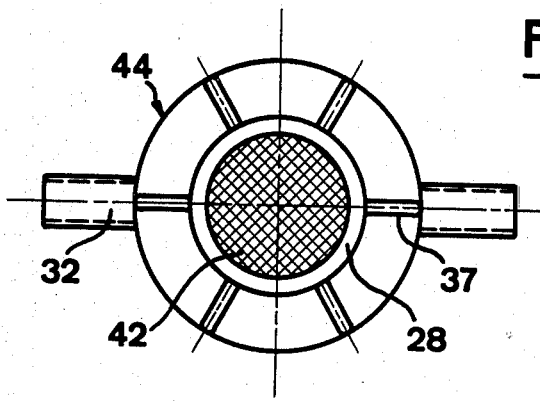
FIG. 7 shows a top view of a watering element.

The hydromechanical watering system for flower pots and plant boxes shown in FIG. 1 comprises a hermetically closed water container 1 which can be filled in three different ways.

First, water container 1 can be filled with water by closing relief valve 4 and removing the air-tight, closeable screw cover 2. Water or fertilizer can then be added through the opening in container 1.

Second, water container 1 can be filled by connecting a tap or faucet to pipeline 5. To fill container 1 through pipeline 5 one connects the source of tap water to pipeline 5, closes relief valve 4 and opens filling valve 6. Turning on the tap allows water to flow through filling pipe 5 into water container 1. A ventilation pipe 20 connected to water container 1 allows air to escape from the water container thereby allowing one to fill water container 1 without removing the air-tight closeable screw cover 2.

Third, water container 1 can be filled automatically by using electromagentically operated valves 4 and 6 which are controlled by a float switch 7. The filling is accomplished the same as in the second method; however, the float switches and electromagnetically operated valves permit automatic refilling of water container 1.

During filling of the water container 1 using filling pipeline 5, water enters water container 1 through a water tube nipple 9 and a pipe 10. The incoming water increases the air pressure in top of container 11 thus forcing air in the top of water container 11 to discharge through an air tube nipple 11. The increased pressure in nozzle 11 and pipeline 27 forces the level of water in transparent tube 12 below the level of ventilation tube 13 to permit air to discharge into the lower end of vertical ventilation pipe 20. If water container 1 is filled manually, the operator terminates the filling operation when water begins to enter nipple 11. After filling, valve 4 is opened and valve 6 is closed.

Water supply unit 12 comprises a transparent vertical tube 14 having at the lower end a water tube nipple 15 for connection to a flower box and a water-tight pipe cover 16 which seals the lower end of cylindrical pipe 16. Pipe cover 16 can be removed for cleaning purposes. Water pipe cover 16 has a fastener (not shown) for attaching water supply unit 12 and support members 17 to a wall. Located at the top end and on the side of water supply unit 12 is a rubber sleeve or collar 19 that forms an air-tight seal between tube 14 and a vertical ventilation pipe 20. Ventilation pipe 20 extends through rubber sleeve 10 and is located coaxially within tube 14. Ventilation pipe 20 comprises a straight cylindrical tube with a passage therein that permits air to flow through ventilation pipe 20 while collar 19 prevents air from flowing past the exterior surface of ventilation pipe 20. The lower end of ventilation pipe 20 controls the reference level 22 of the supply water to plant boxes 23 through a water pipeline 24. That is, the water level in the plant boxes is determined by the horizontal plane that extends through the bottom of ventilation pipe 20.

To enable a remote check of the water level of the system one can check water level in a transparent tube located at the end of plant boxes 23. Tube 25 connects through supply lines to the water supply unit 12. To check the water level by visual inspection, one removes the air-tight closing stopper 26 and allows the water in the system to seek the reference level 22 in tube 25. This allows a remote user to check the level of the water in container 1 by determining if water enters tube 25.

The reference numeral 22 generally indicates the reference level 22 of the water supplied to the plant boxes 23. Note, the water level is in the same horizontal plane as the bottom of ventilation pipe 20. In operation, the water level of the system remains at the level of lower end 21 of ventilation pipe 20 as long as there is water available in water container 1. In operation, the end of ventilation pipe 20 is raised until a water level is maintained in a channel located in the bottom of the flower pot or box. Typically, the water level is adjusted by trial and error or visual comparison of the water level to water channel depth.

In normal operation of water supply unit 12, the absorption of water by plants reduces the water level in water supply unit 12. Removing water from water supply unit 12 causes a reduction of pressure in container 1 and water supply unit 12. As the pressure decreases within the containers, the atmospheric pressure acting on the water level in ventilation pipe 20 forces the water level below the end of ventilation pipe 20. This allows air to enter transparent pipe 14 through the lower end 21 of ventilation pipe 20. As air enters ventilation pipe 20, it rises to the top of pipe 14 and enters container 1 through air pipe nipple 18, pipeline 27, and nozzle 11. This increases the air pressure in container 1 allows water to flow from container 1 into water supply unit 12 until the lower end of ventilation pipe 20 fills with water 23. When the water level in the ventilation pipe 20 is above the end of ventilation tube 12, water can no longer flow above the reference level 22. As water is consumed through a set of watering cylinders, water flows through nipple 15 and pipeline 24 to plant boxes 23 causing the process to repeat and allow further water to enter water supply unit 12. However, in no event does the water level in the plant or flower boxes exceed the water level determined by the end of ventilation pipe 20.

Referring to FIGS. 2, 3, and 4, the watering cylinders are shown in greater detail. FIG. 2 shows a side view of a plant box, FIG. 3 shows a top view, and FIG. 4 shows a bottom view of plant box 23. Plant box 23 contains four watering cylinders 28 that are supplied with water through water holes 29 which are connected to water supply channel 30. Located on top of water supply channel 30 is a water-tight covering strip 31 that is fastened thereto with a suitable adhesive. A nipple 32 located on the end of plant box 23 permits plant boxes 23 to be connected to a water supply unit 12 or to another plant box. The intermediate bottom 33 contains large grid areas 34 to ensure ventilation of the plant roots.

Spaced along the bottom of plant box 23 are supporting ribs 37 that support the intermediate bottom 33. A slot 38 at the upper end of the ventilation columns 39 which contain the ventilation holes 35 prevents the sealing of ventilation holes 35 by intermediate bottom 33. The bottom ribs 40 on the outside of plant box 23 provide spacing of the plant box from a supporting surface to prevent sealing of ventilation holes 35 when the plant box is placed on a base.

FIG. 5 shows a cross sectional view of a plant box 23 with a watering cylinder 28. The top of plant box 23 contains a reinforced ridge 43 to provide strength to the thin wall plant box 23. Sealed on the bottom of plant box 23 is a covering strip 31 that forms a portion of watering channel 30 that extends along the bottom of plant box 23. In operation, water enters channel 30 through nipple 32; note, the intermediate bottom 33 rests upon supporting ribs 37 and is above water channel 30. A hole 36 permits condensation or excess water to flow to the enclosed chamber below intermediate bottom 33. A slot 38 in ventilation columns 39 prevents sealing of the exterior ventilation hole 35. Slot 38 is positioned high enough so that the condensing water from the roots of the plants cannot flow out of plant box 23. Watering hole 29 within watering cylinder 28 is covered with a foam material plug 42 which prevents the soil or roots from entering watering channel 30. Watering cylinders 28 of plant boxes 23 shown in FIGS. 2 to 5 are formed together with the plant boxes 23 in one piece. The watering cylinders can have any shape such as round, square or rectangular. In addition, the watering cylinders can be made of plastic and can be manufactured together with the flower pot or plant box in one piece by injection molding. In typical usage, the water level would be adjusted so as to maintain channel 30 in a full condition and extend at least partially into polymer foam plug 42.

Figure 6:
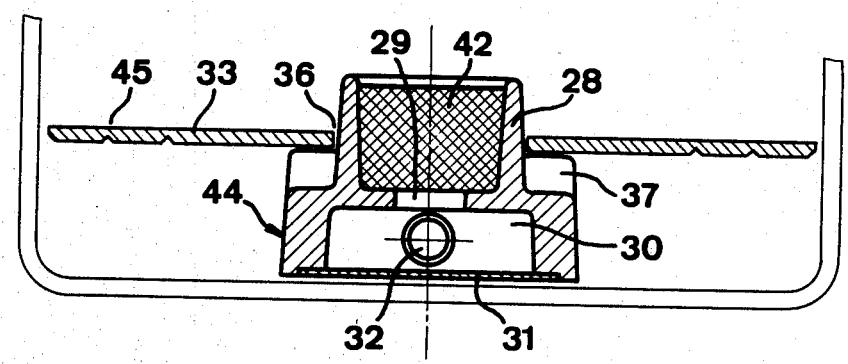
FIG. 6 shows a separate watering element for existing plant boxes.

FIG. 6 shows a modification of the invention whereby watering cylinders 28 are attached to a separate watering element 44 which can be inserted into existing plant boxes or flower pots. The intermediate bottom 33 is provided with corresponding holes 36 having break notches 45 for the adaptation of intermediate bottom 33 to existing plant boxes or flower pots. Separate watering elements 44 can be attached to one another or used individually.

FIG. 7 shows a top view of watering element 44 with a watering cylinder 28 having a polymer foam plug 42 located therein. Supporting ribs 37 are spaced regularly around the watering cylinder 28. Nipples 32 are provided on opposite sides of watering cylinder 28 to provice connection of watering elements 44 to each other.

Figure 8:
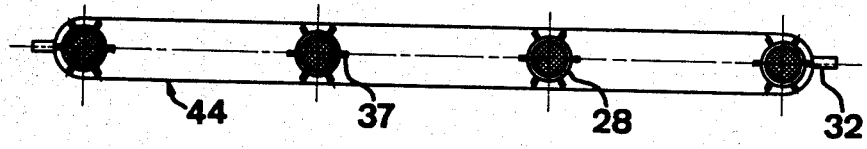
FIG. 8 shows a top view of a watering element with four watering cylinders.

FIG. 8 shows a top view of an alternate embodiment of watering element 44 having a common water chamber (not shown) with four watering cylinders 28 with equally spaced supporting ribs 37 attached around the periphery of each watering cylinder 28. Located on ends of watering element 44 are two nipples 32 for attachment to the water system on additional plant boxes.

I claim:

1. A watering system for plant boxes comprising:
   a water supply unit operable for filling when in a closed condition, said water supply unit having an air-tight closable cover, a top fluid passage and a bottom fluid passage;
   a tube, said tube having a top fluid passage, a first lower fluid passage and a second lower fluid passage, said tube having an opening therein for a ventilation pipe;
   a first fluid passage connecting said top fluid passage of said water supply unit to said top fluid passage of said tube to thereby permit flow of fluid therethrough;

a second fluid passage connecting said bottom fluid passage of said water supply unit to said first lower fluid passage of said tube;

a shut off valve located in said second fluid passage for opening and closing said second fluid passage;

a ventilation pipe for controlling the level of water in a watering cylinder, said ventilation pipe located in said tube, said ventilation pipe having a lower end located in said tube and an upper end projecting through said tube so that said upper end is above the liquid level in said water supply unit, said upper end located in communication with the atmosphere, said upper end located above said top fluid passage of said water supply unit to permit air to escape therethreough during filling of said water supply unit;

an air-tight seal located between said tube and said ventilation pipe to prevent fluid from escaping between said tube and said ventilation pipe, said ventilation pipe vertically adjustable so that the water supply in the watering cylinder can be set to a desired level by the position of the lower end of said ventilation pipe;

a watering cylinder for supplying water to the roots of a plant, said watering cylinder including a foam plug that permits flow of water therethrough but restricts root growth therethrough;

a third fluid passage connecting said second lower fluid passage of said tube to said watering cylinder to permit flow of fluid from said tube to said watering cylinder;

a water supply filling passage connected to said second fluid passage said water supply filling passage operable to be connected to a source of water to permit filling of said water supply unit when said air-tight closable cover is in a closed condition and when said shut off valve in said second passage is in a closed condition to thereby permit discharge of air in said water supply unit through said top fluid passage, said tube and ventilation pipe;

said ventilation pipe vertically adjustable within said tube to permit the vertical positioning of said lower end of said ventilation pipe in said tube to thereby control the water level in said watering cylinder;

said watering cylinder located within plant boxes and below the root level of a plant located in said plant boxes; and said watering cylinder including a watering element for insertion into a plant box and whereby said watering element can be connected to a watering supply unit, said watering element including ventilation holes to permit air to discharge therethrough and means for maintaining the ventilation holes in an open position, said watering cylinder including a hole for flow of water into said plant boxes.

* * * * *